United States Patent [19]

Ziemek et al.

[11] Patent Number: 4,506,135
[45] Date of Patent: Mar. 19, 1985

[54] METHOD AND APPARATUS FOR MANUFACTURING HEAT EXCHANGER TUBES

[75] Inventors: Gerhard Ziemek; Friedrich Schatz, both of Langenhagen; Dieter Müller, Wedemark, all of Fed. Rep. of Germany; Douglas W. Rowell, Woodbury, Conn.

[73] Assignee: kabelmetal electro Gesellschaft mit beschränkter Haftung, Hanover, Fed. Rep. of Germany

[21] Appl. No.: 459,868

[22] Filed: Jan. 21, 1983

[30] Foreign Application Priority Data

Apr. 24, 1982 [DE] Fed. Rep. of Germany ....... 3215381

[51] Int. Cl.³ ............................................. B23K 9/225
[52] U.S. Cl. ..................................... 219/107; 219/61; 29/157.3 C
[58] Field of Search ................... 29/157.3 A, 157.3 C, 29/157.4; 219/107, 130.5, 59.1, 60 R, 127, 61

[56] References Cited

U.S. PATENT DOCUMENTS

| 3,023,300 | 2/1962 | Lehnert | 219/60 R |
| 4,136,272 | 1/1979 | Rudd | 219/107 |
| 4,336,643 | 6/1982 | Roberts | 29/157.3 C |
| 4,339,654 | 7/1982 | Harriau et al. | 219/107 |

FOREIGN PATENT DOCUMENTS 2745138  4/1979  Fed. Rep. of Germany ..... 29/151.3 A

*Primary Examiner*—Roy N. Envall, Jr.
*Assistant Examiner*—C. M. Sigda
*Attorney, Agent, or Firm*—Martin A. Farber

[57] ABSTRACT

For the manufacture of heat exchanger tubes having a metal strip (tangential surface) welded to the surface of the tube, the metal strip is fastened to the surface of the tube by through-welding with welding current of alternating value.

35 Claims, 6 Drawing Figures

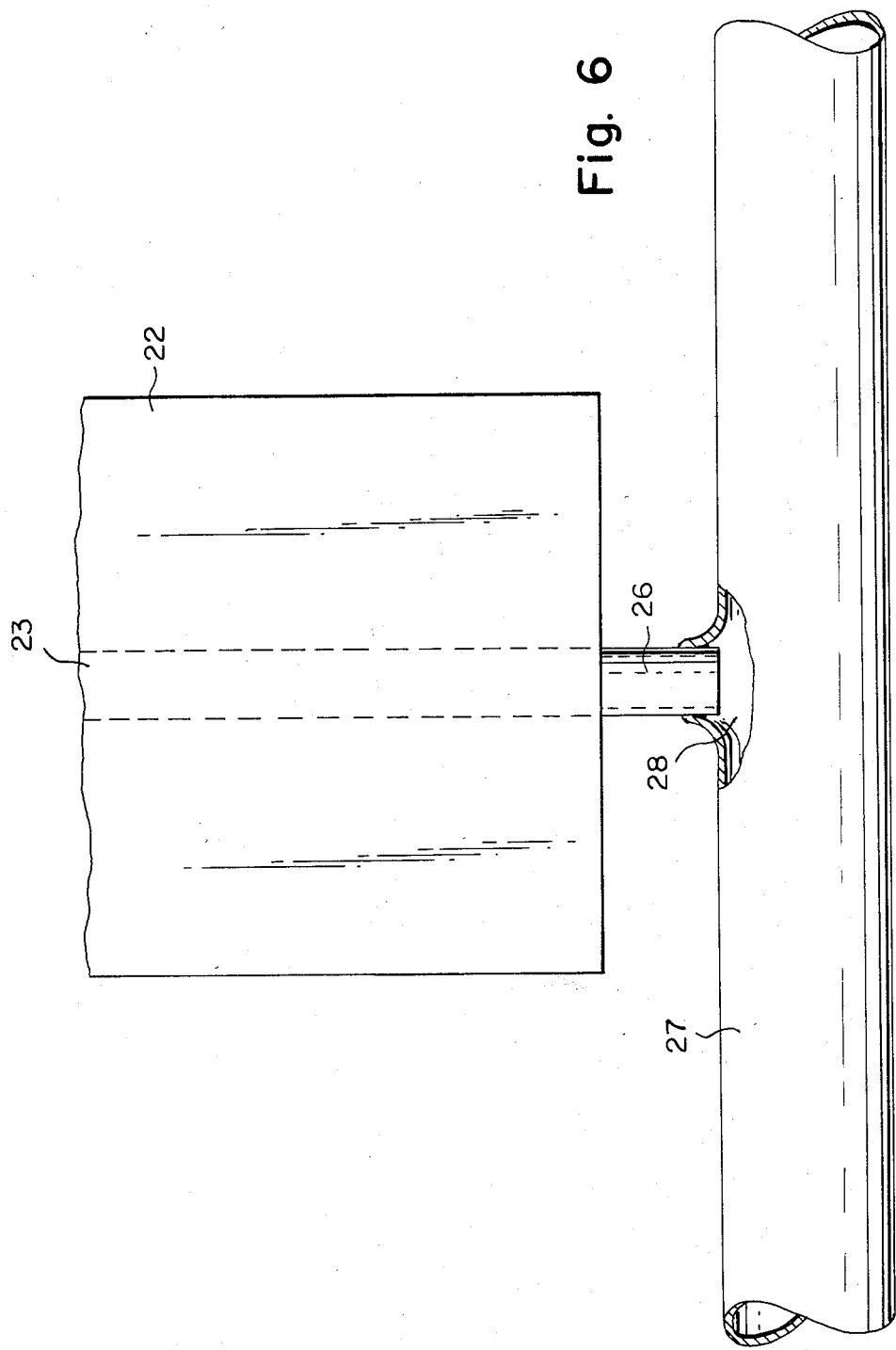

METHOD AND APPARATUS FOR MANUFACTURING HEAT EXCHANGER TUBES

The present invention relates to a method and apparatus for manufacturing finned heat exchanger tubes of predetermined length, particularly absorber tubes for solar collectors, from a metal tube having a tangential surface which increases the surface of the tube and is formed of a metal strip which is fed to the surface of the tube and welded to it.

Due to the increasing scarcity and increase in cost of primary energy such as petroleum, coal, natural gas, etc., the utilization of low-temperature heat such as waste heat, heat from the ambient air and global radiation are becoming increasingly important. In this connection the development of the heat exchanger which absorbs the heat and by which the efficiency and economy of the installed system are substantially affected is of decisive importance. In the construction of solar collectors it is already known to arrange the tubes which conduct the heat-carrier fluid between a heat insulating layer and a radiation-pervious layer. Up to now only tubes without means for increasing their surface have been provided for this.

A heating tube is also known (West German Utility Model No. 73 45 819) in which the heat conducting tube and the absorption or emission surface form an integrated unit. Such systems, which are manufactured only by extrusion, do not permit economic manufacture.

The object of the present invention, therefore, is to provide a method for economically manufacturing heat exchanger tubes of increased surface.

This object is achieved in accordance with the present invention in the manner whereby the metal strip is fed to a continuously entering seamless or longitudinally seam-welded tube of the desired length and fastened to its surface in longitudinal direction by through-welding with welding current of varying value and after a subsequent surface treatment of the surface of the strip and/or the tube the desired final tube lengths are cut off.

In this way it is possible to manufacture heat exchanger tubes of practically any desired length in a continuous process, which tubes—if one employs longitudinally seam-welded tubes—also lead to a substantial reduction in the weight per meter. Due to the fact that the tangential surface formed by the metal strip fed is metallurgically bonded to the wall of the tube, good heat transfer from the tangential surface to the heat-carrier fluid flowing in the tube is assured. By the selective temporary reduction of welding current during the continuous method of manufacture it is possible, without difficulty, to produce merely a temporary bond between tube and strip at the places at which the tube ends are subsequently located and at the places free of the tangential surface which are soldered into the headers, which bond can be easily done away with during the further course of the work.

The requirement of easy removal of the strip attached to the tube is in direct contradiction to the other requirement of obtaining the best possible heat transfer between strip and tube by a connection between tube surface and strip which is as broad and intimate as possible. A reduction to practice of the inventive concept is achieved in the manner whereby the welding current is at a minimum upon passage through the regions of the subsequent tube ends which are defined by the predetermined finished cut lengths of the tube. Thus manufacture can take place continuously as in the past and the strip is firmly bonded to the surface of the tube with the exception of these previously determined regions at which the strip must be removed in order to provide the capability for connection.

As a further concept of the invention, it is advantageous if the continuously entering tube is straightened in its passage before the connection to the metal strip. In this way an exact guidance of the surface of the tube is assured at the moment when the metal strip is placed on it for welding to the surface of the tube.

The removal of the strip in the aforementioned regions can be effected in the manner that after the cutting off of the finished lengths of tube the metal strip is sawed or stamped off in the region of the ends of the tube and the balance present on the surface is removed mechanically or manually. Another possibility is to remove the strip by stamping or sawing even before the cutting off of the final lengths of tube to permit the final preparation of the ends of the tubes after they have been cut off.

In order to satisfy the requirement of good heat transfer between strip and tube it has proven particularly advantageous for the width of the molten zone formed by the metal strip and the contacting tube wall to be, within the region of the maximum welding current intensity, about 1.2 to 2.5 times the thickness of the strip and preferably 1.5 to 2.0 times said thickness.

If—as also contemplated in a further development of the invention—for instance in the case of argon arc welding, the welding electrode is made negative then the electrode spacing should amount to 0.15 to 1.20 mm and preferably 0.2 to 1.0 mm in order to optimize the heat transfer at the connecting point between the tube and the metal strip.

As already state, after the welding process the metal strip can easily be stamped off and removed practically without residue from the tube. Thus by the invention the result is achieved that the tubes which have been cut to length can, without further intermediate treatment, be connected directly, for instance, to the headers of a heat exchanger. The surface of the heat-exchanger tube can be increased in simple fashion by increasing the surface of the strip by rolling it out, for instance, directly after the welding process. The same effect is obtained if, as a further concept of the invention, the metal strip is roughened on one or both of its sides. The heat absorption capacity of the strip can also be improved if its surface is subjected on one or both sides to a chemical treatment and if therefore, for instance, it is black-chromed or else provided with a suitable coat of paint. All of these measures are adapted further to improve the ability to absorb the energy supplied from the environment.

Another advantageous aspect of manufacture resides in that, in continuous operation, a slit tube is formed from a metal strip and the longitudinal edges of the strip are then welded together and that, thereupon, another metal strip which serves as the tangential surface is fastened by through-welding to the surface of the tube. It may at times be advantageous to fasten the tangential metal strip in the region of the tube surface which is free of the weld seam of the tube edges; this can easily be done in the manner whereby the tube is turned or the metal strip is guided at an angle to the horizontal. For the tube itself as well as for the tangential surface a copper strip of thin wall thickness of 0.2 to 2.0 mm, and preferably 0.6 to 1.5 mm, has proven favorable. This material can be welded excellently and has excellent heat-transfer properties together with sufficient strength.

The welding of the strip to the surface of the tube and possibly also the welding of the edges of the slit tube are effected by electric arc welding under an inert gas. This method has proven suitable particularly in the case of thin wall thicknesses; the surface of the material is protected from oxidation. Due to the fact that a non-melting electrode is advisedly used in this process, the region of the weld seam consists of the same material as the tube and the metal strip.

In the case of a continuously entering seamless or longitudinally seam-welded finished tube it is advisable for the tube to first of all be straightened. In order to be able to carry out this and other machining processes continuously, the apparatus of the invention consists of a roll straightening device for the incoming bare tube, a split clamp capstan, and a following welding device with welding-current control for the metal strip fed as tangential surface. The roll straightening device, as a further concept of the invention, consists of pairs of rollers which are associated vertically and horizontally with the surface of the tube.

If, as is also contemplated in the carrying out of the invention, a longitudinally seam-welded thin-walled tube is used for the transport of the fluid then the device for the method consists of the arrangement one behind the other of a shaping device which shapes a metal strip into a slit tube, consisting, for instance, of several pairs of rollers, followed by a welding device as well as a following split clamp capstan. This is followed by a welding device with welding-current control for the metal strip serving as the tangential surface and depending on the circumstances, finally, a separation and/or stamping device which is movable in the longitudinal direction and cuts off the tube.

With the above and other objects and advantages in view, the present invention will become more clearly understood in connection with the detailed description of a preferred embodiment, when considered with the accompanying drawings, of which:

FIG. 6 shows the heat exchanger tube incorporated into the header of a heat exchanger.

Figure 1:
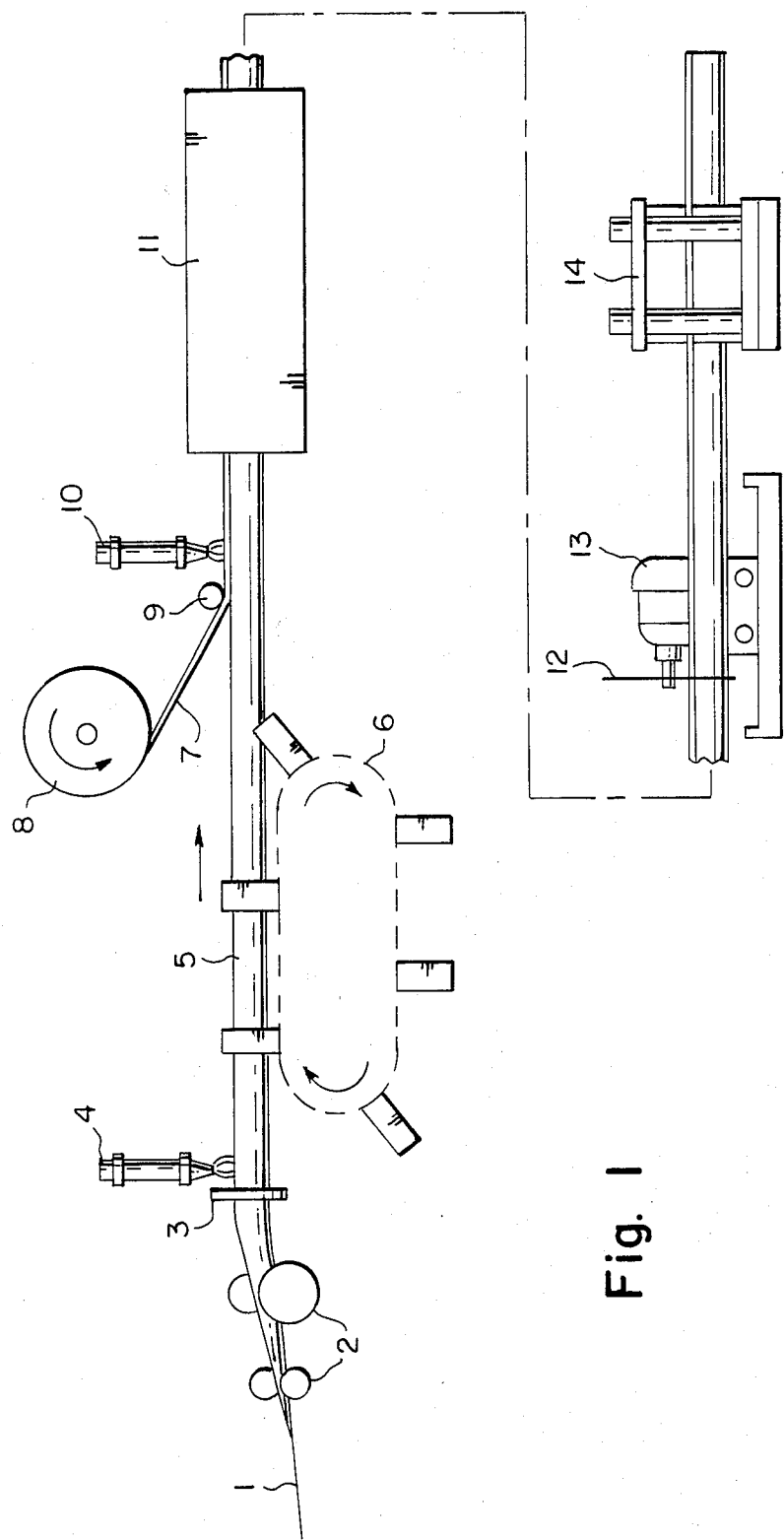
FIG. 1 is a simplified schematic view of an apparatus used in practicing the invention.

FIG. 1 shows the manufacture of a heat exchanger tube in which a copper strip 1 of a wall thickness of, for instance, 0.6 mm which comes from a supply (not shown) after the trimming of its edges and possibly after degreasing, is shaped into a slit tube in a shaping tool 2 consisting of sets of rolls. Immediately behind the shaping tool there is a shaping ring 3 which closes the slit tube and holds the edges of the strip in position with respect to each other before the edges of the strip are welded together by means of the electrode 4 of an electric arc-welding device which operates under inert gas.

The thin-walled tube 5 produced in this manner is withdrawn by a pulling jaw or split clamp capstan 6 mounted on continuous parallel chains which releasably clamp the tube 5 from lateral sides and pull the tube along. Thereupon a copper strip 7 which is removed from the supply 8 and fed at an angle to the tube 5 is applied by means of a roller 9 onto the surface of the tube with its axis parallel to the axis thereof and the strip 7 is metallurgically bonded to the tube by through-welding by means of the electrode 10.

A following device 11 (shown diagrammatically) serves to increase the surface of the strip 7 which has been welded-on, for instance by rolling it out, particularly in the region of its edges, or else by a chemical treatment or a coat of paint in order to improve the heat absorption properties.

A cut-off device 12 in the form of a circular saw is driven by a motor 13 and by means of which predetermined lengths are continuously cut off and fed to the following stamping device 14. This device 14 serves for the removal of the strip (now called a fin) in the region of the ends of the tube so that the tube can then be inserted without further treatment into a heat-exchanger system, for instance by soldering.

Figure 2:
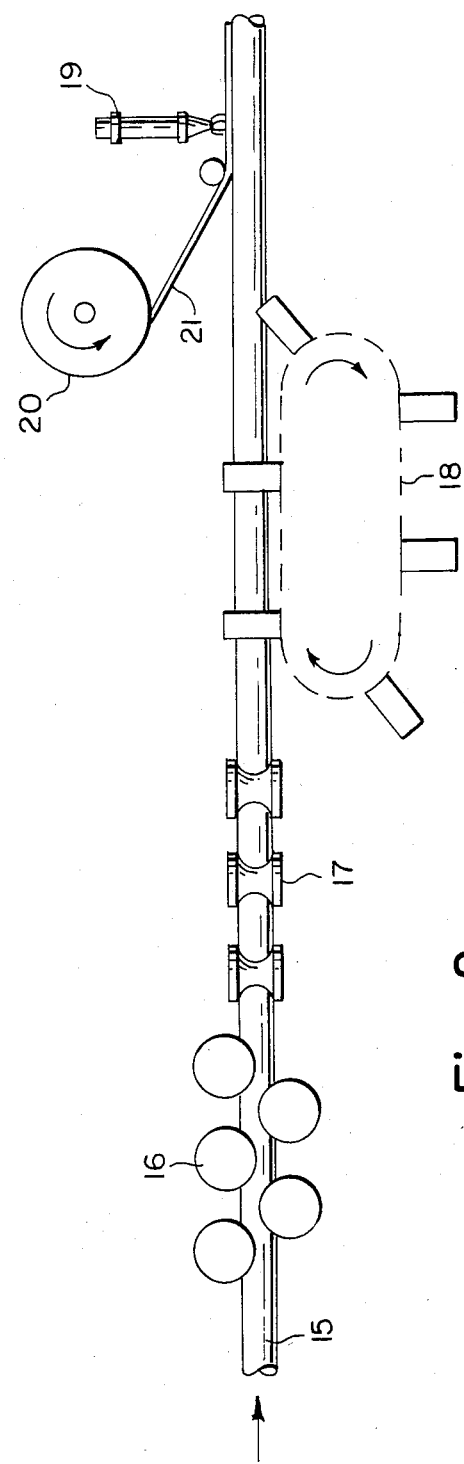
FIG. 2 is a simplified schematic view of another embodiment of the apparatus used in practicing the invention.

A preferred embodiment of the invention is shown in FIG. 2. In this case a seamless or longitudinally seam-welded copper tube 15 withdrawn from a supply (not shown) travels into a roll-straightening device which is formed essentially of the vertically arranged pairs of rolls 16 and the following horizontally arranged pairs of rolls 17. The tube 15, which is thus continuously straightened, then passes through a clamping-jaw or chuck draw-off 18 and is fed, in still straightened condition, to the welding device which has been shown diagrammatically and the welding current of which can be controlled in a varying manner. By means of it, the strip 21, preferably consisting of copper, which serves as a tangential surface and is withdrawn from the supply 20 is fastened by through-welding onto the surface of the tube 15. The further process steps can then be carried out in the manner described with reference to FIG. 1.

Figure 3:
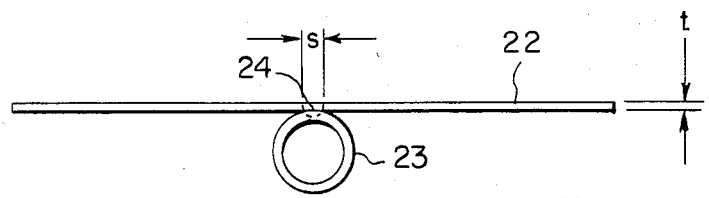
FIG. 3 is an end view of the heat exchanger tube incorporating one embodiment of the present invention.

A heat exchanger tube manufactured by the method of FIG. 1 or 2 is shown in FIG. 3. The strip 22, having a strip thickness t of 0.6 mm, is connected by the weld seam 24 to the tube 23. For optimum heat transfer the width of the weld seam in the region of a melt zone s is so selected that it is equal, for instance, to 1.5 to 2.0 times the thickness t of the strip.

Figure 4:
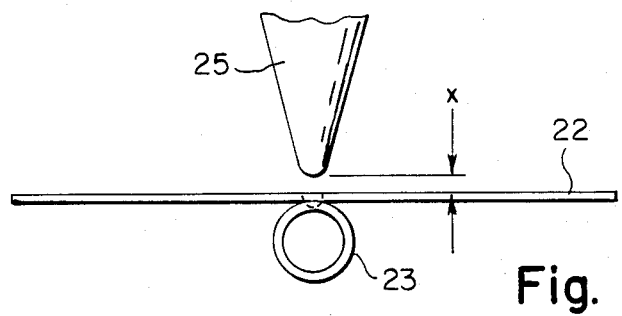
FIG. 4 is another end view thereof upon passage through a welding device.

FIG. 4 shows the arrangement of the tube 23 and of the strip 22 upon passage through the welding device, which in this case is indicated by the diagrammatically shown welding electrode 25. This electrode is, for instance, of negative polarity and the distance from the surface of the strip to the tip of the electrode, designated x here, is preferably 0.2 to 1.0 mm.

Figure 5:
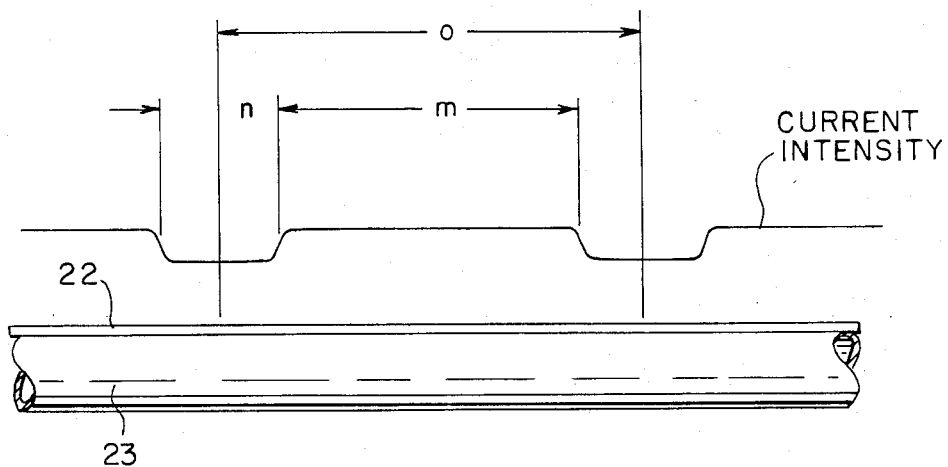
FIG. 5 is a side view thereof.

In order that the strip can be removed without difficulty at the place of the subsequent tube connections or the tube ends, the welding current is—as contemplated by the invention—controlled in such a manner that the welding electrode is acted on by an alternating welding current, that is a varying, but DC current. This measure is shown in FIG. 5 in which the course of the welding current is indicated over the tube 23 and strip 22. Upon the full current intensity of, for instance, 150 A, a through-welding of the strip 22 is effected, producing an intimate metallurgical bond with the surface of the tube. In the following region n, the current intensity is decreased—as shown—to about 50 A. This has the result that while the arc remains stable on the strip 22 and does not tear off, the connection between the strip 22 and tube 23 is only a superficial one and therefore can be removed easily upon the subsequent stamping process. The fastening of the strip to the tube should be so selected in the regions n that the strip is just still held fast on the tube and a stable material is thus present for the cutting or stamping process. During the following constant region m and its maximum current intensity there is again produced an intimate bonding between the tube 23 and the strip 22. The cutting of the finished heat-exchanger tube is effected in the region n of minimum current intensity so that, in the embodiment shown, the length of the tube corresponds to the region o.

Finally, FIG. 6 shows a heat-exchanger tube, consisting of tube 23 and strip 22, which has been freed at its end 26 from the strip 22 and soldered into a header 27 at the point 28.

Further heat-exchanger tubes manufactured in accordance with the invention which are soldered in place then form the overall heat exchanger.

We claim:

1. A method of manufacturing heat exchanger tubes of predetermined length, particularly absorber tubes for solar collectors, from a metal tube having a tangential surface to increase the effective surface of the tube, said method comprising
   feeding a metal strip to a continuously entering longitudinal tube,
   continuously along the entire length of the tube fastening said strip tangentially to the tangential surface of the tube in the longitudinal direction of the tube by arc through-welding from the side of the strip opposite the tube with DC welding current of predetermined varying but uninterrupted value so as to form a continuous welding along the entire length of the tube having predetermined stronger welding regions and lighter welding regions and thereafter
   cutting the tube into predetermined lengths.

2. The method according to claim 1, wherein the continuously entering longitudinal tube is straightened before the metal strip is welded thereon.

3. The method according to claim 1, wherein the tube is cut into the predetermined lengths at positions of the tube where the welding current was at a minimum.

4. The method according to claim 1, wherein after the tube is cut to the predetermined lengths, the metal strip at end portions of the cut tube is removed by stamping.

5. The method according to claim 1, wherein after the tube is cut to the predetermined lengths the metal strip at end portions of the cut tube is removed by sawing.

6. The method according to claim 3, wherein after the tube is cut to the predetermined length the metal strip is removed at the end portions of the cut tube.

7. The method according to claim 1, wherein before the tube is cut in the predetermined lengths at positions on the tube the metal strip is removed from the tube in regions of said positions.

8. The method according to claim 1, wherein the tube is cut into the predetermined lengths at positions on the tube, the metal strip is superficially tacked to the tube at regions of said positions on the tube wherein the welding current was at a minimum.

9. The method according to claim 1, wherein a molten zone is formed by through welding at the metal strip and the surface of the tube contacting the metal strip at a region of a maximum current intensity value, a lateral width of said zone being approximately 1.2 to 2.5 times the thickness of the strip.

10. The method according to claim 1, wherein
    a molten zone is formed by through welding at the metal strip and the surface of the tube contacting the metal strip at a region of a maximum current intensity value, a lateral width of said zone being approximately 1.5 to 2.0 times the thickness of the strip.

11. The method according to claim 1, further comprising the step of
    using a negative polarity welding electrode during through welding, with the electrode spacing from the strip being approximately 0.15 to 1.20 mm.

12. The method according to claim 11, wherein
    the electrode spacing from the strip is approximately 0.2 to 1.0 1 mm.

13. The method according to claim 1, wherein
    the metal strip which has been welded to the surface of the tube is subjected to a surface treatment wherein the surface of the strip is increased by rolling it out directly after the welding step.

14. The method according to claim 1, wherein
    the metal strip which has been welded to the surface of the tube is subjected to a surface treatment, wherein the surface of the strip is roughened on one side.

15. The method according to claim 14, wherein
    the surface of the strip is roughened on both sides.

16. The method according to claim 1, wherein
    the metal strip which has been welded to the surface of the tube is subjected to a surface treatment, wherein the surface of the strip is painted on one side.

17. The method according to claim 16, wherein
    the surface of the strip is painted on both sides.

18. The method according to claim 1, wherein
    said tube is a longitudinally seam-welded tube, longitudinal edges of the tube being welded together forming a weld seam, and the metal strip being fastened by through-welding to a surface of the seam-welded tube.

19. The method according to claim 18, wherein
    the strip is fastened to the tube in a region which is free of said weld seam.

20. The method according to claim 1, wherein
    the strip has a thickness of 0.2 to 2.0 mm.

21. The method according to claim 1, wherein
    the tube has a wall thickness of 0.2 to 2.0 mm.

22. The method according to claim 20, wherein
    the strip has a thickness of 0.6 to 1.5 mm.

23. The method according to claim 21, wherein
    the tube has a wall thickness of 0.6 to 1.5 mm.

24. An apparatus for manufacturing heat exchanger tubes from a continuous longitudinal tube comprising
    means for engaging and moving the continuous longitudinal tube,
    means for feeding a metal strip against the surface of the tube,
    electrically controlled means for welding the metal strip via a continuous uninterrupted DC welding current of selectively variable intensity, tangentially continuously in a longitudinal direction to the surface of the tube after the metal strip is positioned against the surface of the tube.

25. The apparatus according to claim 24, wherein the electrical control means comprises means for varying the welding current intensity from a predetermined maximum value to a predetermined minimum value to furnish an intimate metallurgical bond between the metal strip and the tube when the current is at its maximum intensity and a superficial bond between the metal strip and the tube when the current is at its minimum intensity.

26. The apparatus according to claim 24, wherein said engaging and moving means comprises a split clamp capstan draw.

27. The apparatus according to claim 26, wherein said electrically controlled means for welding comprise an arc welding means with welding-current control for connecting the metal strip to said longitudinal tube positioned after the split clamp capstan and the feeding means.

28. The apparatus according to claim 24, wherein said continuous longitudinal tube is formed initially from a longitudinally entering metal strip, said apparatus including means for forming the longitudinally entering metal strip into a slit tube, an arc-welding means which operates under inert gas for welding said slit tube to form said continuous longitudinal tube.

29. The apparatus according to claim 28, further comprising
cutting means displaceable in the direction of movement of said longitudinal tube for cutting the tube into predetermined lengths, said cutting device being arranged downstream of the welding device for welding the metal strip to the surface of the tube in the direction of movement of the tube.

30. The apparatus according to claim 24, further comprising
surface treatment means for treating the surface of said strip and cutting means downstream of said surface treatment means and displaceable in the direction of movement of said longitudinal tube for cutting said longitudinal tube into predetermined lengths, said cutting means being arranged downstream of the welding means for welding the strip to the tangential surface of said tube in the direction of movement of the tube.

31. The apparatus according to claim 24, further comprising
means for removing a predetermined amount of the metal strip at predetermined end portions of the tube.

32. The apparatus according to claim 24, further comprising
roller straightening means for straightening the longitudinal tube as the latter moves through the apparatus before the engaging and moving means.

33. The apparatus according to claim 32, wherein said roller straigtening means comprises pairs of rollers associated vertically and horizontally with the surface of the tube, the contours of said rollers defining a path of movement for said tube.

34. The apparatus according to claim 25, wherein the electrical control means maintains the welding current intensity at the predetermined maximum value and the predetermined minimum value, respectively, each of said values being respectively constant over respective periods of time.

35. The apparatus according to claim 34, wherein said predetermined maximum value is substantially 150 A and said predetermined minimum value is substantially 50 A.

* * * * *